US011091654B2

United States Patent
Kuang et al.

(10) Patent No.: US 11,091,654 B2
(45) Date of Patent: Aug. 17, 2021

(54) SPRAY-ON EXTERIOR COATING COMPOSITIONS FOR WOOD TREATMENT

(71) Applicant: Koppers Performance Chemicals Inc., Pittsburgh, PA (US)

(72) Inventors: Min Kuang, Peachtree City, GA (US); Jun Zhang, Peachtree City, GA (US)

(73) Assignee: KOPPERS PERFORMANCE CHEMICALS INC., Pittsburgh, PA (US)

( * ) Notice: Subject to any disclaimer, the term of this patent is extended or adjusted under 35 U.S.C. 154(b) by 117 days.

(21) Appl. No.: 15/965,410

(22) Filed: Apr. 27, 2018

(65) Prior Publication Data

US 2019/0092949 A1    Mar. 28, 2019

Related U.S. Application Data

(60) Provisional application No. 62/492,607, filed on May 1, 2017.

(51) Int. Cl.
| | |
|---|---|
| *C09D 5/18* | (2006.01) |
| *C09D 175/02* | (2006.01) |
| *C08K 5/00* | (2006.01) |
| *C08L 75/02* | (2006.01) |
| *B05B 7/04* | (2006.01) |
| *C09D 175/12* | (2006.01) |

(52) U.S. Cl.
CPC .............. *C09D 5/18* (2013.01); *B05B 7/0408* (2013.01); *C08K 5/0066* (2013.01); *C08L 75/02* (2013.01); *C09D 175/02* (2013.01); *C09D 175/12* (2013.01)

(58) Field of Classification Search
CPC ................................ C09D 5/18; B06B 7/0408
See application file for complete search history.

(56) References Cited

U.S. PATENT DOCUMENTS

| | | | |
|---|---|---|---|
| 2014/0242404 A1* | 8/2014 | Hughes | A01N 55/02 428/541 |
| 2016/0083593 A1 | 3/2016 | Marauska et al. | |

FOREIGN PATENT DOCUMENTS

| | | |
|---|---|---|
| WO | WO-2009143001 A2 | 11/2009 |

OTHER PUBLICATIONS

Notification of Transmittal of the International Search Report and the Written Opinion of the International Searching Authority dated Oct. 17, 2018, issued in PCT/US2018/029891.

* cited by examiner

*Primary Examiner* — Nathan T Leong
(74) *Attorney, Agent, or Firm* — K&L Gates LLP

(57) ABSTRACT

Methods for spraying a coating composition, with or without a fire retardant, onto a wood product, and wood products produced by the methods are disclosed. The method comprises a two-component system comprising (i) one or more aliphatic isocyanate compounds; and (ii) one or more aliphatic amine compounds, and, optionally, one or more fire retardants which are stored separately and combined in a spray gun to form a mixture which is then sprayed onto the wood product to form an external coating on one or more surfaces of the wood product. Wood coated with the compositions disclosed herein have increased dimensional stability and are resistant to checking and/or splitting compared to untreated wood.

29 Claims, 3 Drawing Sheets
(3 of 3 Drawing Sheet(s) Filed in Color)

SPRAY-ON EXTERIOR COATING COMPOSITIONS FOR WOOD TREATMENT

The instant application claims priority to U.S. Provisional Application Ser. No. 62/492,607 filed May 1, 2017, which is hereby incorporated by reference herein in its entirety. All references, patents and publications cited herein are hereby incorporated by reference in their entireties.

FIELD OF THE INVENTION

The field of the invention relates to spray-on exterior coating compositions, with or without fire retardant compositions, and methods of applying the compositions.

BACKGROUND

Wood and wood products have numerous desirable qualities as construction materials, including relatively low cost, structural strength, paint-ability and stain-ability, insulating properties, wide availability, renewability of the resource, and pleasing aesthetic characteristics. As a result, wooden materials are used extensively in exterior applications, such as utility poles, railroad wooden bridges, ties, cladding, sidings and decks. Flammability, however, is one of the most notable disadvantages of using wood and wood products as construction materials. One of the main fire hazards in outdoor environment is wildfire, such as forest fire, vegetation fire, grass fire, peat fire, bushfire, and hill fire. Wildfire is an uncontrolled fire often occurring in wild land areas across the United States and the World. The outdoor fire hazards including wildfire not only lead to hundreds of millions of dollars' damage in exterior wooden structures, but also cause significant human injuries and even loss of lives. Therefore, there is an imperative need for the wood protection industry to develop fire retardants to protect exterior wooden structures.

An effective exterior fire retardant must meet the following criteria: 1) Fire retardancy performance; 2) UV resistance; 3) water or rain resistance; 4) Fast curing (less than one hour or minutes), especially for applying fire retardant to in-service wooden structures. 5) Durability during transportation, handling and processing at job-site.

The known fire retardant technologies in the prior art include pressure impregnation and latex-based surface coatings. The fire retardants for use in pressure impregnation generally comprise water-soluble components, such as phosphate compounds, nitrogen compounds, boron compounds, sulfate compounds, and halogenated compounds. These compounds are water-soluble so that the fire retardant components can be readily leached out of the treated wood during water or rain exposure. In addition, pressure impregnation is not feasible for in-service wooden structures. As a result, this approach is not a long-term effective or feasible way to protect exterior wooden materials The latex based fire retardant coating technology is often used as a surface spray-on application for protecting wood materials. The latex fire retardant coating can provide a certain degree of fire protection for exterior wood structures. However, the latex fire retardant coating on wood surfaces can be often damaged due to scratch, abrasion, impact or processing at the job-site. In addition, latex based coatings do not afford long-term UV and weather resistance to treated wood, thus, a re-coating is always required after several years of exterior exposure. Another draw-back of latex-based fire retardant coatings lies in that it takes hours or days for the coating to cure and the coating cannot be applied at cold temperatures or climate. Latex coated materials cannot be processed until they are completely dry. This significantly slows down overall production throughput. For in-service wood structures, this delayed curing process becomes impractical.

The fire retardant compositions of the present invention address all of these drawbacks, and have the following characteristics:

Instantaneous curing reaction. The coatings require only minutes or less than one hour for curing to occur and only minutes or less than two hours to be free of tackiness or stickiness, even at extremely cold temperatures.

UV and water leach resistance, which results in long-term fire protection.

High durability. The coatings of the instant invention are based on a polyurea coating film that is resistant to scratch, abrasion and contact impact.

Effective fire retardancy.

The main components of wood are cellulose, hemicellulose and lignin. Cellulose and hemicellulose are hydrophilic structures that contain hydroxyl groups. Hydroxyl groups interact with water molecules to form hydrogen bonds. Consequently, wood is capable of absorbing as much as 100% of its weight in water producing swelling. Evaporation leads to shrinkage. Because this natural water absorption/evaporation cycle occurs non-uniformly, this cycle creates internal stresses within the wood. These stresses cause the wood to check, split and warp.

Research activities to improve the dimensional stability of wood have spanned many decades. Various approaches have been attempted to reduce the affinity of wood for water, such as heat treatment, chemical and enzymatic modification of hydroxyl groups on cellulose or hemicellulose, or provision of a barrier coating (either external or internal).

Currently, three commercial processes are available to impart dimensional stability to wood-thermal treatment, acetylation and furfurylation. Thermal treatment will improve the dimensional stability of wood, however, it also will cause significant loss of mechanical strength. In softwoods, acetylation generally confers an anti-swelling efficiency (ASE) of about 75% with an associated weight increase of about 26% to 28%. Acetylation requires impregnation of acetic anhydride into wood prior to initiation of acetylation. The acetylation process will generate by-product acetic acid in the treated wood. As a result, post-treatment removal of acetic acid is required; however, residual acetic acid will remain in wood. The generation of acetic acid used during wood treatment requires stainless steel, corrosion-resistant treating equipment. In addition, residual acid in the treated wood product requires the use of stainless steel and corrosion-resistant metal fastener hardware. Acetylated wood is also extremely prone to mold growth when exposed to a moist environment. As a result, acetylated wood requires a surface protective coating or colorants if used in an outdoor condition. Furfurylation generally provides treated wood with an ASE of about 60% and a weight gain of about 30%. Furfurylation processes and furfulated wood release undesirable volatile organic compounds (VOC) during the curing process. In addition, furfurylation also results in increased brittleness of the wood. The characteristics, expense and complexity of these processes for enhancing the dimensional stability of wood limit the commercial usefulness of these processes.

Research on improved treatments for enhancing the dimensional stability of wood has included cell-wall bulking treatments. The deposition of bulking agents in wood can be achieved by impregnating non-reactive bulking agents into the wood or by impregnating monomers into the wood followed by polymerization of the monomers within the wood. The bulking agents can be water soluble or insoluble, reactive or non-reactive with wood components. The bulking agents known to those skilled in the art include polyethylene glycol (PEG), phenol, resorcinol, melamine and urea-formaldehydes, phenol furfural, furfuryl-analine and furfuryl alcohol and various vinyl resins such as polystyrene, polymethyl methacrylate, polyacrylonitrile, polyvinyl chloride with the help of wood swelling agents. With the exception of PEG, most bulking agents penetrate into wood but remain in the cell lumen. As a result, these bulking treatments may temporarily retard water absorption by wood, but do not provide long-term stabilization, because the hydroxyl groups in the wood cell wall remain unmodified and are consequently still available to absorb water molecules.

The inventors have discovered that the spray-on coatings disclosed herein improve the dimensional stability of wood compared to wood that has not been treated with the disclosed coatings. Treated wood as disclosed herein is resistant to cracking, checking, warping, and splitting.

SUMMARY OF THE INVENTION

In certain embodiments, the invention is directed to methods of forming a fire retardant coating on one or more surfaces of a wood product comprising the steps of: (a) providing a two-component system comprising (i) one or more aliphatic isocyanate compounds; (ii) one or more aliphatic amine compounds, and one or more fire retardants, and (b) combining component (i) and component (ii) of step (a) in a spray gun to form a mixture of component (i) and component (ii); and then coating one or more surfaces of a wood product by spraying the mixture of step (b) onto one or more surfaces of said wood product.

In certain embodiments, the ratio of aliphatic amine compound to isocyanate compound is from about 5:1 to about 1:5 (weight/weight). In certain embodiments, the ratio of aliphatic amine compound to isocyanate compound is from about 2:1 to about 1:2 (weight/weight). In certain embodiments, the ratio of aliphatic amine compound to isocyanate compound is from about 1.2:1 to about 1:1.2 (weight/weight). In certain embodiments, the ratio of aliphatic amine compound to isocyanate compound is approximately 1:1 (weight/weight).

In certain embodiments, component (i) and component (ii) are pre-heated prior to being mixed. The temperature to which component (i) and component (ii) are pre-heated can be about 200° F., or about 180° F., or about 160° F., or about 140° F., or about 120° F., or about 110° F., or about 100° F., or about 80° F., or about 60° F., or about 40° F.

In certain embodiments, said aliphatic amine compound is selected from the group consisting of polyamines, primary amines, secondary amines and tertiary amines.

In certain embodiments, the fire retardant is selected from the group consisting of inorganic metal oxides, hydroxides, salts and expandable graphite.

In certain embodiments, the fire retardant can be one or more compounds selected from aluminum trihydroxide, magnesium hydroxide, antimony trioxide, antimony pentoxide, calcium antimonite, zinc stannate, zinc hydroxyl-stannate, zinc borate, zinc silicate, zinc phosphate, zinc oxide, zinc hydroxide, phosphate esters, red phosphorus, melamine phosphate, zinc phosphate, calcium phosphate, magnesium phosphate, ethylenediamine phosphate, calcium silicate, silica, magnesium silicate, and zinc silicate.

In certain embodiments, the fire retardant can be one or more compounds selected from phosphate compounds, nitrogen-containing compounds, dipentaerythritol, pentaerythritol, dextrin and boron-containing compounds.

In certain embodiments, the fire retardant can be one or more compounds selected from monoammonium phosphate, diammonium phosphate, triammonium phosphate, ammonium polyphosphate, monosodium phosphate, disodium phosphate, trisodium phosphate, monopotassium phosphate, dipotassium phosphate, tripotassium phosphate, urea phosphate, ethylenediamine phosphate, guanylurea phosphate and melamine phosphate.

In certain embodiments, the fire retardant can be one or more compounds selected from dicyandiamide, urea, guanylurea phosphate, melamine, melamine phosphate, ammonium phosphate, cyanamide, diammonium phosphate, ammonium polyphosphate, monoethanolamine, diethanolamine, triethanolamine and hexamethylenetetramine.

In certain embodiments, the fire retardant can be one or more compounds selected from boric acid, tetraboric acid, metaboric acid, sodium borate, disodium octaborate, tetraborate, and zinc borate.

In certain embodiments, the fire retardant can be one or more compounds selected from a phosphate compound and expandable graphite.

In certain embodiments, the fire retardant can be one or more compounds selected from a phosphate compound, a nitrogen containing compound, and expandable graphite, expandable flake graphite or intumescent flake graphite, collectively expandable graphite In certain embodiments, the expandable graphite can have an onset expansion temperature of 100° C., or 150° C. or 200° C. or 250° C. or 300° C. or up to 600° C. The onset temperature defines the temperature at which the material starts to expand. In certain embodiments, the expandable graphite can have an expansion volume of 25, 50, 100, 150, 200, 250, 300, 400, 500, 750 or 1000 $cm^3/g$. Typical particle size of the expandable graphite varies from a few microns up to 500 microns.

In certain embodiments, wherein said aliphatic isocyanate compound is selected from the group consisting of isocyanate pre-polymers of aliphatic diisocyanates, aliphatic diisocyanates, trimerized aliphatic diisocyanates, and the biuretic form of aliphatic diisocyanates.

In certain embodiments, component (i) and component (ii) are stored in separate storage vessels prior to being mixed in the spray gun.

In certain embodiments, the fire-retardant coating is substantially uniform in thickness. In other embodiments, the coating is not substantially uniform in thickness. In certain embodiments, the thickness of the coating is about 0.1 mm to about 50 mm. In certain embodiments, the thickness of the coating is about 0.5 mm to about 5 mm. In certain embodiments, the thickness of the coating is about 1 mm to about 3 mm.

An advantage of the methods and compositions of the invention is that once mixed, component (i) and component (ii) rapidly react such that curing takes place in a matter of seconds to minutes. Accordingly, in certain embodiments, the coating step further comprises the step of allowing the coating to cure for about 1 minute to about 120 minutes at ambient temperature. In certain embodiments, the curing takes place for about 1 minute to about 60 minutes. In certain embodiments, the curing takes place for about 10 minutes to about 30 minutes. In certain embodiments, the curing takes place for about 5 minutes to about 10 minutes. In certain embodiments, the curing takes place for less than about 1 minute at ambient temperature.

In certain embodiments, the wood product is pre-treated with a wood preservative composition to render said wood product resistant to insect attack and fungal decay. In certain embodiments, the wood preservative composition comprises a metal compound and an organic biocide. In certain embodiments, the metal compound is selected from the group consisting of compounds of copper, zinc, iron, and silver. In certain embodiments, the copper compound is selected from the group consisting of copper metal, cuprous oxide, cupric oxide, copper hydroxide, copper carbonate, basic copper carbonate, copper oxychloride, copper 8-hydroxyquinolate, copper dimethyldithiocarbamate, copper omadine, copper borate and basic copper borates.

In certain embodiments, the coating step is performed at an ambient temperature of less than about 40° C., or less than about 30° C., or less than about 20° C., or less than about 10° C., or less than about 0° C.

In certain embodiments, the coating is an intumescent coating.

In certain embodiments, component (i) and/or component (ii) further comprises one or more colorants. In certain embodiments, component (i) and/or component (ii) does not comprise a colorant. In certain embodiments, component (i) and/or component (ii) further comprises one or more UV resistance compounds. In certain embodiments, component (i) and/or component (ii) further comprises one or more aromatic compounds.

In certain embodiments, the wood product is selected from the group consisting of a deck, a rail, a fence, a utility pole, railway tie, a component of a railroad bridge, cladding, siding, and decking. In certain embodiments, the wood product is timber, plywood, laminated veneer lumber (LVL), cross laminated timber (CTL), parallel strand lumber (PSL), structural glued laminated timber, particle board or lumber.

In certain embodiments, the coating is applied to the wood product while the wood product is in service in the field. In certain embodiments, the coating is applied to the wood product prior to said wood product being placed into service.

In certain embodiments, the invention is directed to a wood product produced by a method comprising the steps of (1) providing a two-component system comprising (i) one or more aliphatic isocyanate compounds; and (ii) one or more aliphatic amine compounds, and one or more fire retardants, and (2) combining component (i) and component (ii) of step (a) in a spray gun to form a mixture of component (i) and component (ii); and coating one or more surfaces of a wood product by spraying the mixture of step (b) onto one or more surfaces of said wood product.

In certain embodiments, the invention is directed to systems for applying a fire retardant composition to a substrate, said system comprising: (1) a mechanism for spraying said fire retardant composition via a spray gun; (2) a first storage vessel comprising component (i), wherein component (i) comprises one or more aliphatic isocyanate compounds; (3) a second storage vessel comprising component (ii), wherein component (ii) comprises one or more aliphatic amine compounds, and one or more fire retardants; wherein the two storage vessels are connected to a spray gun via hoses or other tube-like mechanism; and component (i) and component (ii) are combined within said spray gun prior to spraying. In certain embodiments, the substrate is a wood product. In certain embodiments, the wood product is pre-treated with a wood preservative composition.

In certain embodiments, the invention is directed to fire retardant compositions comprising a mixture of (a) one or more aliphatic amine compounds, (b) one or more fire retardants, and (c) one or more aliphatic isocyanate compounds.

In certain embodiments, the invention is directed methods of imparting increased dimensional stability to a wood product comprising the steps of: (1) providing a two-component system comprising (i) one or more aliphatic isocyanate compounds; and (ii) one or more aliphatic amine compounds; (2) combining component (i) and component (ii) of step (a) in a spray gun to form a mixture of component (i) and component (ii); (3) coating one or more surfaces of said wood product by spraying the mixture of step (b) onto one or more surfaces of said wood product; wherein said wood product has increased dimensional stability compared to a wood product that has not been treated according to steps (a), (b), and (c).

In certain embodiments, the invention is directed to a wood product produced by a method comprising the steps of: (1) providing a two-component system comprising (i) one or more aliphatic isocyanate compounds; and (ii) one or more aliphatic amine compounds, and; (2) combining component (i) and component (ii) of step (a) in a spray gun to form a mixture of component (i) and component (ii); and coating one or more surfaces of a wood product by spraying the mixture of step (b) onto one or more surfaces of said wood product.

In certain embodiments, the invention is directed to a system for applying a composition to a substrate, said system comprising (1) a mechanism for spraying said composition via a spray gun; (2) a first storage vessel comprising component (i), wherein component (i) comprises one or more aliphatic isocyanate compounds; and (3) a second storage vessel comprising component (ii), wherein component (ii) comprises one or more aliphatic amine compounds; wherein component (i) and component (ii) are combined within said spray gun prior to spraying. In certain embodiments, the substrate is a wood product. In certain embodiments, the wood product is pre-treated with a wood preservative composition. In certain embodiments, the invention is directed to compositions comprising wood, wherein said wood is coated on one or more surfaces with a polymer formed by combining (i) one or more aliphatic isocyanate compounds; and (ii) one or more aliphatic amine compounds. In certain embodiments, the wood is dimensionally more stable than wood that is not coated with said polymer. In certain embodiments, the wood is pre-treated with a wood preservative composition. In certain embodiments, the wood preservative composition comprises a metal compound and/or an organic biocide. In certain embodiments, the wood is resistant to insect attack and/or fungal decay. In certain embodiments, the wood is more resistant to checking and/or splitting than wood that has not been coated with said polymer. In certain embodiments, the polymer comprises a polyurea polymer. In certain embodiments, the coating further comprises additives selected from the group consisting of colorants and uv blockers.

BRIEF DESCRIPTION OF THE FIGURES

The patent application file contains at least one drawing executed in color. Copies of this patent application publication with the color drawing will be provided by the Office upon request and payment of the necessary fee.

DETAILED DESCRIPTION OF THE INVENTION

Figure 1:
FIG. 1: Uncoated CCA (chromated copper arsenate) treated SYP (Southern Yellow Pine) (left), coated CCA treated SYP (middle) after 2000 hours of accelerated QUV testing.
Figure 2:
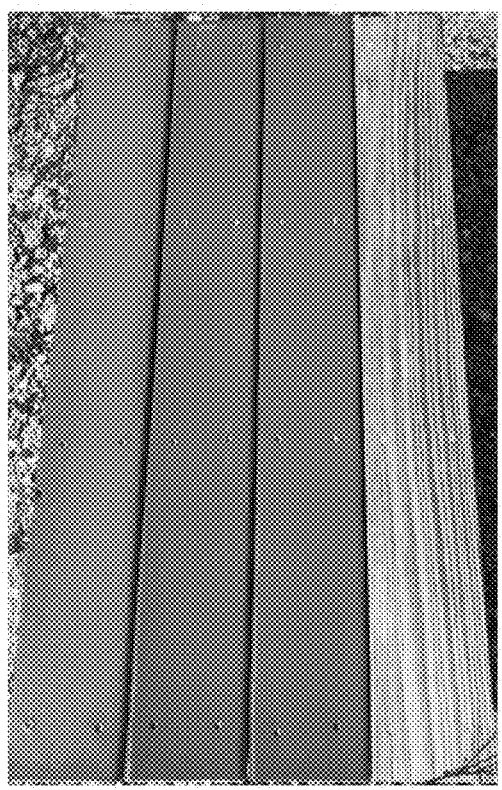
FIG. 2: Formulation 16 coated CCA treated SYP (the first three from left to right) and uncoated CCA treated SYP (the 4$^{th}$ from left to right) after one-year outdoor weathering in Georgia.
Figure 3:
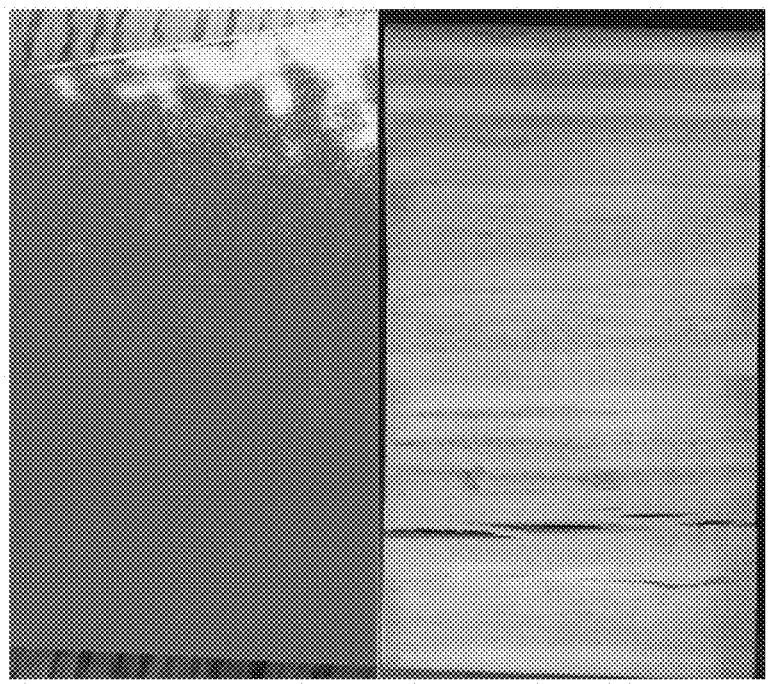
FIG. 3: Formulation 19 coated CCA treated SYP (left) and uncoated CCA treated SYP (right) after 2000 hours of accelerated QUV testing.
Figure 4:
FIG. 4: Formulation 19 coated CCA treated SYP (the first five from left to right) and uncoated CCA treated SYP (the 6$^{th}$ and 7$^{th}$ from left to right) day 1 outdoor in Georgia.
Figure 5:
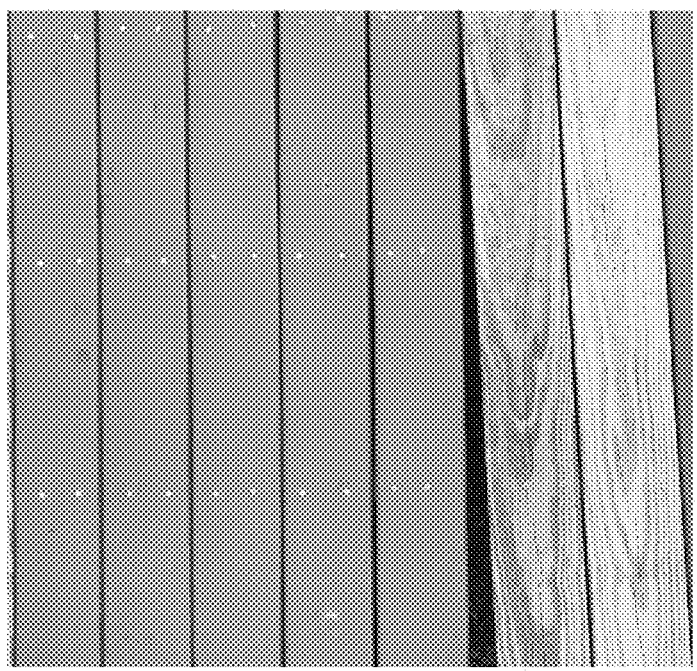
FIG. 5: Formulation 19 coated CCA treated SYP (the first five from left to right) and uncoated CCA treated SYP (the 6$^{th}$ and 7$^{th}$ from left to right) after 10 months outdoor weathering in Georgia.

The exterior fire retardant compositions of the invention are applied to the surface of wood by spraying with a reactor sprayer. The compositions can be applied to the wooden material in-situ where the wooden structure is exposed outdoor in-service, or be applied to wood materials prior to being put in-service. Non-limiting examples of wooden materials used in exterior applications are utility poles, railroad bridges, railway ties, cladding, decking and sidings. For example, the composition can be applied to the surface of in-service utility poles in an outdoor field, or the composition can be applied to the utility poles in a warehouse prior to installation. Another example is the protection of wooden siding/cladding materials for housing construction. The compositions can be applied to the surface of sidings/claddings after construction. Alternatively, the composition can be applied to siding/cladding materials prior to construction. Other examples of wood products that can be applied with the coating composition are timber, plywood, laminated veneer lumber (LVL), cross laminated timber (CTL), parallel strand lumber (PSL), structural glued laminated timber, particle board or lumber.

The compositions of the present invention comprise two parts of chemicals, Parts A and Part B. Part A and Part B are stored separately in two tanks in a sprayer unit. During the coating application, the two components are then delivered at high pressure with separate pumps through individual hoses. Part A and Part B are mixed at the nozzle of the sprayer gun, and then the mixed chemicals are expelled from the gun immediately once the trigger is released.

Disclosed in this application is a polyurea fire retardant coating composition. The composition comprises two components, Part A and Part B.

Part A (Component (i))

Part A comprises an aliphatic isocyanate compound or a mixture of aliphatic isocyanates (expressed as NCO functional group). Organic solvents can also be added to Part A if there is need to adjust viscosity or the moles of NCO functional group.

Aliphatic Isocyanates: Examples of aliphatic isocyanates include, but are not limited to monomers, polymers, or any variant reaction of isocyanates pre-polymer. They are typically aliphatic diisocyanates, and more particularly are the trimerized or the biuretic form of aliphatic diisocyanates, such as, hexamethylene diisocyanate (HDI oligomers); The hexamethylene diisocyanate (HDI) oligomers can be selected from, but not limited to, hexamethylene diisocyanate trimer, hexamethylene diisocyanate biuret or hexamethylene diisocyanate uretdion, preferably hexamethylene diisocyanate biuret. Or can the bifunctional monomer of the tetraalkyl xylene diisocyanate, such as tetramethyl xylene diisocyanate. Cyclohexane diisocyante is also to be considered a preferred aliphatic isocyanate. Other useful aliphatic polyisocyanates include aliphatic diisocyanates, for example, alkylene diisocyanates with 4 to 12 carbon atoms in the alkylene radical, such as 1, 12-dodecane diisocyanate and 1, 4-cyclohexane diisocyanate as well as any desired mixture of these isomers; 1-isocyanato-3, 3, 5-trimethyl-5-ioscyanatomethyl-cyclohexane (isophorone diisocyanate or IPDI isomer)); 4,4'-, 2,2'- and 2,4'-dicyclohexyl-methane diisocyanate, as well as the corresponding isomer mixtures, and the like.

The NCO-content of oligomers can be selected from, but not limited to, 5-45% by weight, preferably 15-25% by weight, most preferably 22% by weight, based on 100% by weight of the oligomers.

Non-limiting examples of commercially available aliphatic isocyanates include: Desmophen® XP 2406, Desmophen® XP 2599, Desmophen® VP LS 2371, Desmophen® XP 2763, Desmophen® N75 BA, Desmophen® N3300, Desmophen® N3800 and Desmophen® N3900.

Part B (Component (ii))

Part B is a mixture of aliphatic amine compounds and, optionally, fire retardant components, which are described in detail below. The aliphatic amines can be primary amines, secondary amines or tertiary amines (expressed as —NH functional group). The fire retardant components can be phosphate-based fire retardant chemicals or phosphate-free fire retardant chemicals. Additives, such as those described in greater detail below, including but not limited to anti-weathering agents, dimensional stabilization agents, heat reflective agents, matting agents, colorants, solvents, surfactants, defoamers, anti-abrasion agents, adhesive promoters, may also be added to the Part B mixture provided there are no compatibility issues. Additionally, a small amount of aromatic amines may be added to adjust the coating strength and elasticity.

Aliphatic Amines: Examples of aliphatic amines include, but are not limited to polyamines, or amine chain extenders including primary amines, secondary amines and/or tertiary amines.

The polymer polyamine is made of at least one polyoxyalkyleneamine, preferably a mixture of at least two polyoxyalkyleneamines, known as polyether amines. Such polyoxyalkyleneamines are preferably amine-terminated bifunctional or higher-functional polyalkylene oxides, in general polyoxyethylene oxides or polyoxypropylene oxides, having average molecular weights of 200-8000. It is also possible to use amine-terminated polytetrahydrofuran (PTHF). The amine groups of the polyether amines are primary amine, secondary amine and tertiary amine groups. It is also possible to use only one polyether amine.

Amine chain extenders can be a primary amine or a sterically hindered secondary aliphatic diamine that have been designed to give slower reaction times in elastomer/coating systems. The amino resin can be selected from, but not limited to, secondary aliphatic diamine with alicyclic compound modified, secondary aliphatic diamine with branched alicyclic compound modified or secondary aliphatic diamine with line aliphatic compound modified, preferably secondary aliphatic diamine with alicyclic compound modified. The amino equivalent of the amino resin comprising sterically hindered secondary aliphatic diamine can be selected from, but not limited to, 200-400, preferably 270-325.

Nonlimiting examples of commercially available polyamines include: JEFFAMINE® T-5000 amine, JEF- FAMINE® D-2000 amine, JEFFAMINE® T-403 amine, JEFFAMINE® D-400 amine, JEFFAMINE® D-230 amine, JEFFAMINE® SD-231 amine, JEFFAMINE® SD-401 amine and JEFFAMINE® SD-2001 amine.

Nonlimiting examples of commercially available amine chain extenders include: JEFFLINK® 754 diamine, JEFFLINK® 136 diamine, Desmophen® NH 1220, Desmophen® NH 1420, Desmophen® NH 1520, Vestamine A139 and Baxxodur™ PC 136.

During the coating spraying, Part A (the NCO functional group) and Part B (the NH functional group) are mixed together inside of a spray gun. Depending upon the requirement for the final coating film, the ratio of NH to NCO group can vary from 2:1 to 1:2 (weight/weight), preferably 1.2:1 to 1:1.2 or more preferably approximately 1:1.

Fire Retardants: The fire retardants disclosed in the current invention are selected from the group consisting of inorganic metal oxides, hydroxides, salts and expandable graphite. Examples of the inorganic metal compounds of fire retardants include, but are not limited to: metal hydroxides such as aluminum trihydroxide and magnesium hydroxide; antimony compounds such as antimony trioxide, antimony pentoxide and calcium antimonite; zinc compounds such as zinc stannate, zinc hydroxyl-stannate, zinc borate, zinc silicate, zinc phosphate, zinc oxide and zinc hydroxide; phosphorous based compounds such as phosphate esters red phosphorus melamine phosphate, zinc phosphate, calcium phosphate, magnesium phosphate and ethylenediamine phosphate; silicate compounds such as calcium silicate, silica, magnesium silicate and zinc silicate; halogenated compounds such as tetra bromo bisphenol A; nitrogen based compounds such as melamine and its salts, melamine borate and polyamides.

The fire retardants can also be one or more compounds selected from phosphate compounds, nitrogen-containing compounds, dipentaerythritol, pentaerythritol, dextrin and boron-containing compounds. Non-limiting examples of the phosphate compounds are monoammonium phosphate, diammonium phosphate, triammonium phosphate, ammonium polyphosphate, monosodium phosphate, disodium phosphate, trisodium phosphate, monopotassium phosphate, dipotassium phosphate, tripotassium phosphate, urea phosphate, ethylenediamine phosphate, guanylurea phosphate and melamine phosphate.

The fire retardant can be one or more nitrogen-containing compounds. Non-limiting examples of nitrogen containing compounds are dicyandiamide, urea, guanylurea phosphate, melamine, melamine phosphate, ammonium phosphate, cyanamide, diammonium phosphate, ammonium polyphosphate, monoethanolamine, diethanolamine, triethanolamine and hexamethylenetetramine.

The fire retardant can be one or more compounds selected from boric acid, tetraboric acid, metaboric acid, sodium borate, disodium octaborate, tetraborate, and zinc borate.

The fire retardant can also be expandable graphite, expandable flake graphite or intumescent flake graphite, collectively expandable graphite. The expandable graphite can have an onset expansion temperature of 100° C., or 150° C. or 200° C. or 250° C. or 300° C. or up to 600° C. The onset temperature defines the temperature at which the material starts to expand. The expandable graphite can have an expansion volume of 25, 50, 100, 150, 200, 250, 300, 400, 500, 750 or 1000 cm3/g. Typical particle size of the expandable graphite varies from a few microns up to 500 microns.

The principal functional difference between different grade is onset temperature, that is, the temperature at which expansion begins. The particles of expandable graphite should preferably expand at temperatures no higher than about 500° C., preferably no higher than about 250° C. Particle size of the expandable graphite can be from 10 microns to 1000 microns. The particles of expandable graphite are present in the composition at a level of at least about 0.5 parts by weight of graphite per 100 parts by weight of resin. Suitable expandable graphites are commercially available from Sanyo Corporation's SYZR-501, SYZR-501H, SYZR-801, SYZR-802; and UCAR Graph-Tech's GRAFGUARD~Grade 220, GRAFGUARD~Grade 160.

Reactor Sprayer

Part A and Part B are incompatible because they react instantaneously once mixed together. The fire retardant composition is applied to wood surfaces through a reactor sprayer. The components are stored separately in two tanks in the sprayer unit. The two tanks can be equipped with a heating capability and/or agitation/circulation capabilities. During the coating application, the two components, Part A and Part B, are delivered at high pressure with separate pumps through individual hoses. The two components, Part A and Part B, are mixed inside of the sprayer gun, and then the mixed chemicals are expelled from the gun immediately once the trigger is released. The coating film thickness can be achieved through multiple spraying or by adjusting the nozzle speed. In general, the coating film thickness is in the range of about 0.1 mm to about 50 mm, or about 0.5 mm to about 10 mm, or about 1 mm to about 3 mm.

Preservatives

Prior to applying the coating of the instant invention, the wood products may be pre-treated with wood preservatives to provide protection from fungal decay and insect/termite attack. The wood preservative composition can be either a metal-based and/or organic biocide-based formulations, or a combination of both. Non-limiting examples of the metal-based preservatives are the compounds/complexes of copper, zinc, iron of silver. Examples of copper compounds are selected from, but are not limited to, copper metal, cuprous oxide (a source of copper (I) ions), cupric oxide (a source of copper (II) ions), copper hydroxide, copper carbonate, basic copper carbonate, copper oxychloride, copper 8-hydroxyquinolate, copper dimethyldithiocarbamate, copper omadine, copper borate or basic copper borates, copper residues (copper metal byproducts) or any suitable copper source.

Organic Biocides: Non-limiting examples of organic biocides are the triazole, imidazole or pyrazole compounds.

Triazole or imidazole compounds: Examples of triazole and imidazole compounds include, but are not limited to: Non-limiting examples are 1-[[2-(2,4-dichlorophenyl)-1,3-dioxolan-2-yl]methyl]-1H-1,2,4-triazole (azaconazole), 1-[(2RS,4RS:2RS,4SR)-4-bromo-2-(2,4-dichlorophenyl) tetrahydrofurfuryl]-1H-1,2,4-triazole (bromuconazole), (2RS,3RS;2RS,3SR)-2-(4-chlorophenyl)-3-cyclopropyl-1-(1H-1,2,4-triazol-1-yl)butan-2-ol (Cyproconazole), (2RS, 3RS)-1-(2,4-dichlorophenyl)-4,4-dimethyl-2-(1H-1,2,4-triazol-1-yl)pentan-3-ol (diclobutrazol), cis-trans-3-chloro-4-[4-methyl-2-(1H-1,2,4-triazol-1-ylmethyl)-1,3-dioxolan-2-yl]phenyl 4-chlorophenyl ether (difenoconazole), (E)-(RS)-1-(2,4-dichlorophenyl)-4,4-dimethyl-2-(1H-1,2,4-triazol-1-yl)pent-1-en-3-ol (diniconazole), (E)-(R)-1-(2,4-dichlorophenyl)-4,4-dimethyl-2-(1H-1,2,4-triazol-1-yl) pent-1-en-3-ol (diniconazole-M), (2RS,3SR)-1-[3-(2-chlorophenyl)-2,3-epoxy-2-(4-fluorophenyl)propyl]-1H-1, 2,4-triazole (epoxiconazole), (RS)-1-[2-(2,4-dichlorophenyl)-4-ethyl-1,3-dioxolan-2-ylmethyl]-1H-1,2, 4-triazole (etaconazole), (RS)-4-(4-chlorophenyl)-2-phenyl-2-(1H-1,2,4-triazol-1-ylmethyl)butyronitrile (fenbuconazole), 3-(2,4-dichlorophenyl)-6-fluoro-2-(1H-1,2,4-triazol-1-yl)quinazolin-4(3H)-one (fluquinconazole), bis(4-fluorophenyl)(methyl)(1H-1,2,4-triazol-1-ylmethyl)silane (flusilazole), (RS)-2,4'-difluoro-α-(1H-1,2,4-triazol-1-ylmethyl)benzhydryl alcohol (flutriafol), (2RS,5RS;2RS,5SR)-5-(2,4-dichlorophenyl)tetrahydro-5-(1H-1,2,4-triazol-1-ylmethyl)-2-furyl 2,2,2-trifluoroethyl ether (furconazole), (2RS,5RS)-5-(2,4-dichlorophenyl)tetrahydro-5-(1H-1,2,4-triazol-1-ylmethyl)-2-furyl 2,2,2-trifluoroethyl ether(furconazole-cis), (RS)-2-(2,4-dichlorophenyl)-1-(1H-1,2,4-triazol-1-yl)hexan-2-ol (hexaconazole), 4-chlorobenzyl (EZ)—N-(2,4-dichlorophenyl)-2-(1H-1,2,4-triazol-1-yl) thioacetamidate (imibenconazole), (1RS,2SR,5RS;1RS,2SR,5SR)-2-(4-chlorobenzyl)-5-isopropyl-1-(1H-1,2,4-triazol-1-ylmethyl)cyclopentanol (ipconazole), (1RS,5RS; 1RS,5SR)-5-(4-chlorobenzyl)-2,2-dimethyl-1-(1H-1,2,4-triazol-1-ylmethyl)cyclopentanol (metconazole), (RS)-2-(4-chlorophenyl)-2-(1H-1,2,4-triazol-1-ylmethyl)hexanenitrile (myclobutanil), (RS)-1-(2,4-dichloro-β-propylphenethyl)-1H-1,2,4-triazole(penconazole), cis-trans-1-[2-(2,4-dichlorophenyl)-4-propyl-1,3-dioxolan-2-ylmethyl]-1H-1,2,4-triazole (propiconazole), (RS)-2-[2-(1-chlorocyclopropyl)-3-(2-chlorophenyl)-2-hydroxypropyl]-2,4-dihydro-1,2,4-triazole-3-thione (prothioconazole), 3-(2,4-dichlorophenyl)-2-(1H-1,2,4-triazol-1-yl)-quinazolin-4(3H)-one (quinconazole), (RS)-2-(4-fluorophenyl)-1-(1H-1,2,4-triazol-1-yl)-3-(trimethylsilyl)propan-2-ol (simeconazole), (RS)-1-p-chlorophenyl-4,4-dimethyl-3-(1H-1,2,4-triazol-1-ylmethyl)pentan-3-ol (tebuconazole), propiconazole, (RS)-2-(2,4-dichlorophenyl)-3-(1H-1,2,4-triazol-1-yl)propyl 1,1,2,2-tetrafluoroethyl ether (tetraconazole), (RS)-1-(4-chlorophenoxy)-3,3-dimethyl-1-(1H-1,2,4-triazol-1-yl) butan-2-one (triadimefon), (1RS,2RS;1RS,2SR)-1-(4-chlorophenoxy)-3,3-dimethyl-1-(1H-1,2,4-triazol-1-yl) butan-2-ol (triadimenol), (RS)-(E)-5-(4-chlorobenzylidene)-2,2-dimethyl-1-(1H-1,2,4-triazol-1-ylmethyl)cyclopentanol (triticonazole), (E)-(RS)-1-(4-chlorophenyl)-4,4-dimethyl-2-(1H-1,2,4-triazol-1-yl)pent-1-en-3-ol (uniconazole), (E)-(S)-1-(4-chlorophenyl)-4,4-dimethyl-2-(1H-1,2,4-triazol-1-yl)pent-1-en-3-ol (uniconazole-P), and 2-(2,4-difluorophenyl)-1-(1H-1,2,4-triazole-1-yl)-3-trimethylsilyl-2-propanol. Other azole compounds include: amisulbrom, bitertanol, fluotrimazole, triazbutil, climbazole, clotrimazole, imazalil, oxpoconazole, prochloraz, triflumizole, azaconazole, simeconazole, and hexaconazole.

Pyrazoles: Examples of pyrazoles include, but are not limited to: benzovindiflupyr; bixafen; fenpyrazamine; fluxapyroxad; furametpyr; isopyrazam; oxathiapiprolin; penflufen; penthiopyrad; pydiflumetofen; pyraclostrobin; pyrametostrobin; pyraoxystrobin; rabenzazole; sedaxane.

Boron compounds: Examples of boron compounds include, but are not limited to: water-soluble boron compounds, boric acid, sodium borates, such as sodium tetraborate decahydrate, sodium tetraborate pentahydrate, and disodium octaborate tetrahydrate (DOT), potassium borates. Non-limiting examples of water insoluble boron compounds include metal borate compounds such as calcium borate, borate silicate, aluminum silicate borate hydroxide, silicate borate hydroxide fluoride, hydroxide silicate borate, sodium silicate borate, calcium silicate borate, aluminum borate, boron oxide, magnesium borate, iron borate, copper borate, and zinc borate (borax).

Quaternary ammonium compounds: Non-limiting examples are: didecyldimethylammonium chloride; didecyldimethylammonium carbonate/bicarbonate; alkyldimethylbenzylammonium chloride; alkyldimethylbenzylammonium carbonate/bicarbonate; didodecyldimethylammonium chloride; didodecyldimethylammonium carbonate/bicarbonate; didodecyldimethylammonium propionate; N,N-didecyl-N-methyl-poly(oxyethyl)ammonium propionate.

Isothiazolone compounds: Non-limiting examples are: methylisothiazolinone; 5-chloro-2-methyl-4-isothiazoline-3-one, 2-methyl-4-isothiazoline-3-one, 2-n-octyl-4-isothiazoline-3-one, 4,5-dichloro-2-n-octyl-4-isothiazoline-3-one, 2-ethyl-4-isothiazoline-3-one, 4,5-dichloro-2-cyclohexyl-4-isothiazoline-3-one, 5-chloro-2-ethyl-4-isothiazoline-3-one, 2-octyl-3-isothiazolone, 5-chloro-2-t-octyl-4-isothiazoline-3-one, 1,2-benzisothiazoline-3-one, preferably 5-chloro-2-methyl-4-isothiazoline-3-one, 2-methyl-4-isothiazoline-3-one, 2-n-octyl-4-isothiazoline-3-one, 4,5-dichloro-2-n-octyl-4-isothiazoline-3-one, 1,2-benzisothiazoline-3-one, etc., more preferably 5-chloro-2-methyl-4-isothiazoline-3-one, 2-n-octyl-4-isothiazoline-3-one, 4,5-dichloro-2-n-octyl-4-isothiazoline-3-one, 1,2-benzisothiazoline-3-one, chloromethylisothiazolinone; 4,5-Dichloro-2-n-octyl-3 (2H)-isothiazolone; 1,2-benzisothiazolin-3-one.

Pyrethroids: Examples of pyrethroid compounds include, but are not limited to: acrinathrin, allethrin, bioallethrin, barthrin, bifenthrin, bioethanomethrin, cyclethrin, cycloprothrin, cyfluthrin, beta-cyfluthrin, cyhalothrin, gamma-cyhalothrin, lambda-cyhalothrin, cypermethrin, alpha-cypermethrin, beta-cypermethrin, theta-cypermethrin, zeta-cypermethrin, cyphenothrin, deltamethrin, dimefluthrin, dimethrin, empenthrin, fenfluthrin, fenpirithrin, fenpropathrin, fenvalerate, esfenvalerate, flucythrinate, fluvalinate, tau-fluvalinate, furethrin, imiprothrin, metofluthrin, permethrin, biopermethrin, transpermethrin, phenothrin, prallethrin, profluthrin, pyresmethrin, resmethrin, bioresmethrin, cismethrin, tefluthrin, terallethrin, tetramethrin, tralomethrin, transfluthrin, etofenprox, flufenprox, halfenprox, protrifenbute, silafluofen.

AWPA Book of Standards Biocides:

In-service wood products may be directly exposed to the environment and weathering. Utility Poles, railroad ties, and railroad bridges are examples. These types of in-service wood products may be pre-treated with wood preservatives prior to coating with the fire retardant compositions of the invention with preservatives such as Creosote (CR or CR-S), Ammoniacal copper zinc arsenate (ACZA), Chromated copper aresenate (CCA-C), Alkaline copper quat (ACQ, type A, B, C or D), Copper Azole (Type B, and C), Copper HDO Type A, Copper Naphthenate (CuN), Alkaline copper betaine (KDS, and KDS type B), Micronized copper azole (MCA and MCA-C), and Pentachlorophenol (PCP). Examples of commercially used wood preservatives are those listed as U1-17 Preservative/Protectant Standards in the 2017 AWPA (American Wood Protection Association) Book of Standards, such as ACZA, CCA-C, ACQ-A, ACQ-B, ACQ-C, ACQ-D, Cu8, CuN-W, CuN, CX-A, KDS, KDS-B, CA-B, CA-C, PTI, EL2, MCA, MCA-C, SBX, CR, CR-S, CR-PS, PCP-A and PCP-C.

Other Biocides: Other biocides include, but are not limited to: imidachloprid; fipronil; cyfluthrin; bifenthrin; permethrin; cypermethrin; chlorpyrifos, iodopropynyl butylcarbamate (IPBC); chlorothalonil; 2-(thiocyanatomethylthio) benzothiazole; alkoxylated diamines and carbendazim. Other biocides, such as fungicides, bactericides, and moldicides can also be used to treat wood prior to coating.

Other Additives

In addition, other additives such as water repellents, anti-weathering agents, dimensional stabilizers, or fire retardants can be included in the composition for protecting wood.

Water Repellants: Examples of water repellents include, but are not limited to: paraffin wax, olefin wax, petroleum wax, carnauba wax, polyethylene wax, silicone wax, polypropylene wax, PTFE wax and synthetic wax.

Anti-Weathering Agents: Examples of anti-weathering agents include, but are not limited to: pigments such as zinc oxide, zinc sulfide, iron oxide, carbon black, titanium dioxide; UV absorbers such as hydroxyl-substituted benzophenones, hydroxyphenyl benzotriazides, substituted acrylonitriles; UV stabilizers such as hindered amine light stabilizers (HATS); and anti-oxidants such as amines, imidiazoles or complex hindered phenolics.

Dimensional Stabilization Agents: Examples of dimensional stabilization agents include, but are not limited to: waxes such as paraffin wax, olefin wax, petroleum wax, carnauba wax, polyethylene wax, silicone wax, polypropylene wax, PTFE wax and synthetic wax, and polymers such as polystyrene, polyethylene, polypropylene, polyvinyl chloride, polyacrylonitrile, polyvinyl acetate, polyester, acrylic polymers, polyamide, polyurethane, phenolic novolacs, phenolic resoles, urea formaldehyde resins, melamine formaldehyde resins, epoxy resins, natural resins such as rosin and rosin esters, hydrocarbon resins, ketone resins, terpene resins, alkyd resins, silicone resins and silicate resins, and other water insoluble polymers.

Colorants

The coating compositions used in the current invention may also comprise one or more colorants. The colorants can be either a dye or a pigment. Examples of dyes are basic dyes, acid dyes, direct dyes, or reactive dyes. Pigments used for coloration can be organic pigments and/or inorganic pigments.

Non-limiting examples of suitably insoluble inorganic pigments include: iron oxides, including red iron oxides, yellow iron oxides, black iron oxides and brown iron oxides; carbon black, iron hydroxide, graphite, black micaceous iron oxide; aluminum flake pigments, pearlescent pigments; calcium carbonate; calcium phosphate; calcium oxide; calcium hydroxide; bismuth oxide; bismuth hydroxide; bismuth carbonate; copper carbonate; copper hydroxide; basic copper carbonate; silicon oxide; zinc carbonate; barium carbonate; barium hydroxide; strontium carbonate; zinc oxide; zinc phosphate; zinc chromate; barium chromate; chrome oxide; titanium dioxide; zinc sulfide and antimony oxide.

Non-limiting examples of organic pigments include Monoazo (arylide) pigments such as PY3, PY65, PY73, PY74, PY97 and PY98; Disazo (diarylide); Disazo condensation; Benzimidazolone; Beta Naphthol; Naphthol; metal-organic complexes; Isoindoline and Isoindolinone; Quinacridone; perylene; perinone; anthraquinone; diketo-pyrrolo pyrrole; dioxazine; triacrylcarbonium; the phthalocyanine pigments, such as cobalt phthalocyanine, copper phthalocyanine, copper semichloro- or monochlorophthalocyanine, copper phthalocyanine, metal-free phthalocyanine, copper polychlorophthalocyanine, etc.; organic azo compounds; organic nitro compounds; polycyclic compounds, such as phthalocyanine pigments, quinacridone pigments, perylene and perinone pigments; diketopyrrolo-pyrrole (DPP) pigments; thioindigo pigments; dioxazine pigments; quinophthalone pigments; triacrylcarbonium pigments, and Diaryl pyrrolopyroles, such as PR254.

Anti-Weathering Agents and Water Repellents

The coating compositions used in the current invention may also comprise UV stabilizers and/or water repellents or anti-weathering agents. Non-limiting examples of anti-weathering agents include pigments such as zinc oxide, zinc sulfide, iron oxide, carbon black, titanium dioxide; UV absorbers such as hydroxyl-substituted benzophenones, hydroxyphenyl benzotriazides, substituted acrylonitriles; UV stabilizers such as hindered amine light stabilizers (HALS); and anti-oxidants such as amines, imidiazoles or complex hindered phenolics.

Non-limiting examples of suitably insoluble water repellents include paraffin wax, olefin wax, petroleum wax, carnauba wax; polyethylene wax, silicone wax, polypropylene wax, PTFE wax and synthetic wax.

Heat-Reflective Agents

The coating compositions used in the current invention may also comprise one or more heat-reflective agents. Non-limiting examples heat reflective agents include pigments that match visible colors, and pigments that naturally reflect infra-red radiation. The primary purpose for using heat reflective agents is to reduce surface temperature of wood that is exposed to sunshine. Heat-reflective agents also include hollow silica/ceramic microspheres, and glass bubbles that reflect longer wavelength solar radiation.

Matting Agents

The coating compositions used in the current invention also comprise one or more matting agents. Non-limiting examples of matting agents include silica-gel, modified silica, synthetic aluminum silicates, petroleum wax, polyethylene wax, polypropylene wax, carnauba wax, amide wax, PTFE wax and synthetic wax; fillers such as clay, barium stearate, zinc stearate; organic materials, such as carboxyl-acrylic resin, (glycidyl methacrylate) acrylic resin, polyacrylonitrile, polymethlmethacrylate.

EXAMPLES

Basic Chemistry:

Polyurea systems have been defined as the reaction of an isocyanate or isocyanate pre-polymer with a resin blend that consists of amine functional species.

POLYUREA

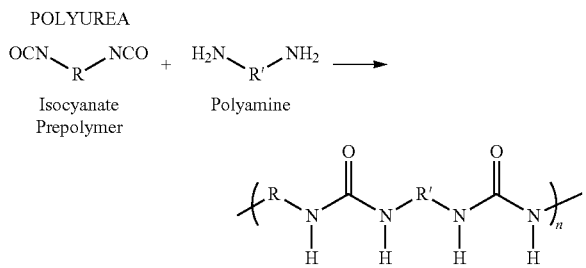

Methods:

There are two different methods of producing polyurea polymers utilized in this work. The first is mixing the two parts on a glass plate, which is a static mixing used to be a fast tool to identify candidate formulation. The second method uses spray equipment with high pressure, impingement mixing.

Static Mixing

Example 1

| Part A: isocyanate | | | |
|---|---|---|---|
| Chemicals | Supplier | Function % | Wt. % |
| Desmophen XP2763 | Covestro | 10.00 | 60.00 |
| Desmophen N3900 | Covestro | 23.50 | 40.00 |
| | | | 100.00 |

| Part B: resin blend | | | |
|---|---|---|---|
| Chemicals | Supplier | Function group | Wt. % |
| Vestamine 139 A | Evonik | 2 | 18.3 |
| Jeffamine D2000 | Huntsman | 2 | 25.4 |
| Baxxodur PC136 | BASF | 2 | 37.62 |
| JLS-APP | | | 11.18 |
| JLS-Penta | | | 3.36 |
| JLS Melamine | | | 3.97 |
| Colorant | Green #7 | | 0.15 |
| | | | 100.00 |
| Gelling time (s) | | | 100 |
| Tack-free time (s) | | | 180 |

Example 2

| Part A: isocyanate | | | |
|---|---|---|---|
| Chemicals | Supplier | Function % | Wt. % |
| Desmophen XP2763 | Covestro | 10.00 | 60.00 |
| Desmophen N3900 | Covestro | 23.50 | 40.00 |
| | | | 100.00 |

| Part B: resin blend | | | |
|---|---|---|---|
| Chemicals | Supplier | Function group | Wt. % |
| Vestamine 139 A | Evonik | 2 | 8.74 |
| Jeffamine D2000 | Huntsman | 2 | 34.98 |
| Baxxodur PC136 | BASF | 2 | 37.62 |
| JLS-APP | | | 11.18 |
| JLS-Penta | | | 3.36 |
| JLS Melamine | | | 3.97 |
| Colorant | Green #7 | | 0.15 |
| | | | 100.00 |
| Gelling time (s) | | | 100 |
| Tack-free time (s) | | | 180 |

Example 3

| Part A: isocyanate | | | |
|---|---|---|---|
| Chemicals | Supplier | Function % | Wt. % |
| Desmophen XP2763 | Covestro | 10.00 | 60.00 |
| Desmophen N3900 | Covestro | 23.50 | 40.00 |
| | | | 100.00 |

| Part B: resin blend | | | |
|---|---|---|---|
| Chemicals | Supplier | Function group | Wt. % |
| Vestamine 139 A | Evonik | 2 | 2.68 |
| Jeffamine D2000 | Huntsman | 2 | 40.32 |
| Baxxodur PC136 | BASF | 2 | 37.62 |
| JLS-APP | | | 11.18 |
| JLS-Penta | | | 3.36 |
| JLS Melamine | | | 3.97 |
| Colorant | Green #7 | | 0.15 |
| | | | 100.00 |
| Gelling time (s) | | | 20 |
| Tack-free time (s) | | | 60 |

| JeffD2K (g) | Vestamin (g) | J/V | Tack-free (s) | Gelling (s) |
|---|---|---|---|---|
| 2.8 | 2 | 1.4 | 180 | 100 |
| 3.6 | 1.2 | 3 | 180 | 100 |
| 4 | 0.8 | 5 | 180 | 100 |
| 4.2 | 0.6 | 7 | 150 | 80 |
| 4.3 | 0.5 | 8.6 | 102 | 30 |
| 4.5 | 0.3 | 15 | 60 | 20 |

When the chain extender Baxxodur PC 136 is used, as the ratio of primary polyetheramines Jeffamine D2000 to secondary amine Vestamin 139 increases from 1.4 to 15, the gelling time shortens from 100 seconds to 20 seconds and tack-free decreases from 180 seconds to 60 seconds.

Example 4

| Part A: isocyanate | | | |
|---|---|---|---|
| Chemicals | Supplier | Function % | Wt. % |
| Desmophen XP2763 | Covestro | 10.00 | 60.00 |
| Desmophen N3900 | Covestro | 23.50 | 40.00 |
| | | | 100.00 |

| Part B: resin blend | | | |
|---|---|---|---|
| Chemicals | Supplier | Function group | Wt. % |
| Jeffamine D2000 | Huntsman | 2 | 18.30 |
| Desmophen NH1520 | Covestro | 2 | 25.42 |
| Baxxodur PC136 | BASF | 2 | 37.62 |
| JLS-APP | | | 11.18 |
| JLS-Penta | | | 3.36 |

Example 5 (continued)

| | | | |
|---|---|---|---|
| JLS Melamine | | | 3.97 |
| Colorant | Green #7 | | 0.15 |
| | | | 100.00 |

Example 5

Part A: isocyanate

| Chemicals | Supplier | Function % | Wt. % |
|---|---|---|---|
| Desmophen XP2763 | Covestro | 10.00 | 60.00 |
| Desmophen N3900 | Covestro | 23.50 | 40.00 |
| | | | 100.00 |

Part B: resin blend

| Chemicals | Supplier | Function group | Wt. % |
|---|---|---|---|
| Jeffamine D2000 | Huntsman | 2 | 31.5 |
| Desmophen NH1520 | Covestro | 2 | 10.5 |
| Baxxodur PC136 | BASF | 2 | 37.62 |
| JLS-APP | | | 11.18 |
| JLS-Penta | | | 3.36 |
| JLS Melamine | | | 3.97 |
| Colorant | Green #7 | | 0.15 |
| | | | 100.00 |

Example 6

Part A: isocyanate

| Chemicals | Supplier | Function % | Wt. % |
|---|---|---|---|
| Desmophen XP2763 | Covestro | 10.00 | 60.00 |
| Desmophen N3900 | Covestro | 23.50 | 40.00 |
| | | | 100.00 |

Part B: resin blend

| Chemicals | Supplier | Function group | Wt. % |
|---|---|---|---|
| Jeffamine D2000 | Huntsman | 2 | 35.8 |
| Desmophen NH1520 | Covestro | 2 | 7.2 |
| Baxxodur PC136 | BASF | 2 | 37.62 |
| JLS-APP | | | 11.18 |
| JLS-Penta | | | 3.36 |
| JLS Melamine | | | 3.97 |
| Colorant | Green #7 | | 0.15 |
| | | | 100.00 |

When the chain extender Baxxodur PC 136 is used, as the ratio of primary polyetheramines Jeffamine D2000 to secondary amine Desmophen NH1520 increases from 0.71 to 5, the gelling time shortens from 100 seconds to 20 seconds and tack-free decreases from 180 seconds to 130 seconds.

| JeffD2K (g) | NH1520 (g) | J/N | Tack-free (s) | Gelling (s) |
|---|---|---|---|---|
| 2 | 2.8 | 0.71 | 180 | 100 |
| 2.4 | 2.4 | 1 | 180 | 80 |
| 3 | 1.8 | 1.67 | 160 | 60 |
| 3.6 | 1.2 | 3 | 150 | 30 |
| 4 | 0.8 | 5 | 130 | 20 |

Example 7

Part A: isocyanate

| Chemicals | Supplier | Function % | Wt. % |
|---|---|---|---|
| Desmophen XP2763 | Covestro | 10.00 | 53.99 |
| Desmophen N3900 | Covestro | 23.50 | 36.00 |
| UCAR EEP | Dow | | 10.01 |
| | | | 100.00 |

Part B: resin blend

| Chemicals | Supplier | | Wt. % |
|---|---|---|---|
| Vestamine | Evonik | | 5.08 |
| Baytec505 | Covstro | | 32.52 |
| Jeffamine D2000 | Huntsman | | 43.70 |
| JLS-APP | | | 11.18 |
| JLS-Penta | | | 3.36 |
| JLS Melamine | | | 3.96 |
| Colorant | Olive007 | | 0.21 |
| | | | 100.00 |

Example 8

Part A: isocyanate

| Chemicals | Supplier | Function % | Wt. % |
|---|---|---|---|
| Desmophen XP2763 | Covestro | 10.00 | 53.99 |
| Desmophen N3900 | Covestro | 23.50 | 36.00 |
| UCAR EEP | Dow | | 10.01 |
| | | | 100.00 |

Part B: resin blend

| Chemicals | Supplier | Function % | Wt. % |
|---|---|---|---|
| Jeffamine D2000 | Huntsman | 1.60 | 33.44 |
| Bax PC136 | BASF | 11.00 | 13.38 |
| Jeffamine link754 | Huntsman | 11.80 | 20.06 |
| JLS-APP | | | 7.36 |
| JLS-Penta | | | 2.25 |
| JLS Melamine | | | 2.65 |
| Colorant | FSW GR | | 0.80 |
| UCAR EEP | Dow | | 20.06 |
| | | | 100.00 |

Example 9

Part A: isocyanate

| Chemicals | Supplier | Function % | Wt. % |
|---|---|---|---|
| Desmophen XP2763 | Covestro | 10.00 | 53.99 |
| Desmophen N3900 | Covestro | 23.50 | 36.00 |
| Oleic acid | | | 10.01 |
| | | | 100.00 |

Part B: resin blend

| Chemicals | Supplier | Function % | Wt. % |
|---|---|---|---|
| Jeffamine D2000 | Huntsman | 1.60 | 33.44 |
| Bax PC136 | BASF | 11.00 | 13.38 |
| Jeffamine link754 | Huntsman | 11.80 | 20.06 |
| JLS-APP | | | 7.36 |
| JLS-Penta | | | 2.25 |
| JLS Melamine | | | 2.65 |
| Colorant | FSW GR | | 0.80 |
| M-8-10 | Stepan | | 20.06 |
| | | | 100.00 |

Two component spray polyurea systems are fast reacting and provide quick return-to-service coatings. (Example 7, 8, 9). However, example 7 coating discolors upon exposure to UV light weathered outside for 300 hours or 200 hours in a QUV chamber due to the aromatic chain extender Baytec 505. The other two polyurea coatings keep the color in a same period of time upon UV exposure outdoor or in QUV chamber due to the absence of aromatic content. Viscosity of both parts are reduced from 1600 cps to about 500 cps at room temperature when diluent is added.

Example 10

Part A: isocyanate

| Chemicals | Supplier | Function % | Wt. % |
|---|---|---|---|
| Desmophen XP2763 | Covestro | 10.00 | 53.99 |
| Desmophen N3900 | Covestro | 23.50 | 36.00 |
| Oleic acid | | | 10.01 |
| | | | 100.00 |

Part B: resin blend

| Chemicals | Supplier | Function % | Wt. % |
|---|---|---|---|
| Jeffamine D2000 | Huntsman | 1.60 | 33.11 |
| Bax PC136 | BASF | 11.00 | 13.24 |
| Jeffamine link754 | Huntsman | 11.80 | 19.86 |
| JLS-APP | | | 7.28 |
| JLS-Penta | | | 2.22 |
| JLS Melamine | | | 2.62 |
| Expandable Graphite | Sanyo | | 0.99 |
| Colorant | FSW GR | | 0.79 |
| M-8-10 | Stepan | | 19.86 |
| | | | 100.00 |

An intumescent flame-retardant coating was achieved using ammonium polyphosphate as acid source, melamine as the blowing agent and pentaerythritol as carbon agent. (Example 8 and 9). Further incorporating expandable graphite as synergistic agent, the coating can form an intumescence char layer when exposed to fire/heat, which acts as a thermal barrier that effectively protects the substrate against fire, thereby maintaining the structural integrity of the underneath substrate.

Examples 11-15: Spray Coating

For application of the spray polyurea elastomer system, a Graco E10HP Reactor Sprayer was used. System processing was done at 2000 psi output pressure, 140 F. Line temperature and system output of approximately 8.0 lbs/min. Samples for testing were generated by spraying onto a horizontal CCA-treated utility pole. Sample thickness were 0.5-5 mm.

| | | Example 11 | Example 12 | Example 13 | Example 14 | Example 15 |
|---|---|---|---|---|---|---|
| Part A: Isocyanate | Desmophen XP2763 | 10.248 | 10.248 | 10.248 | 10.9 | 10.9 |
| | Desmophen N3900 | 6.832 | 6.832 | 6.832 | 6.4 | 6.4 |
| | UCAR EEP | 1.9 | 1.9 | | | |
| | Oleic acid | | | 1.9 | | |
| Part B: Resin | Jeffamine D2000 | 8.29 | 5 | 5 | 5.8 | 5.5 |
| | Des NH1420 | | | | 2 | 1.2 |
| | Jeffamine link754 | | 3 | 3 | 2 | 3.2 |
| | Baxxodur PC136 | | 2 | 2 | 0.5 | 0.5 |
| | Vestamine A139 | 9.65 | | | | |
| | Baytec505 | 6.17 | | | | |
| | JLS-APP | 2.12 | 1.1 | 1.1 | 1.1 | 1.1 |
| | JLS-Penta | 0.64 | 0.34 | 0.34 | 0.35 | 0.35 |
| | JLS Melamine | 0.75 | 0.4 | 0.4 | 0.35 | 0.35 |
| | Colorant | 0.04 | 0.12 | 0.12 | 0.1 | 0.1 |
| | ATH | | | | 0.2 | 0.2 |
| | E-graphite | | | | 0.2 | 0.2 |
| | UCAR EEP | | 3 | | | |
| | M-8-10 | | | 3 | | |

-continued

|  |  | Example 11 | Example 12 | Example 13 | Example 14 | Example 15 |
|---|---|---|---|---|---|---|
| Processing | Iso/Res (molar) | 1.05 | 1.02 | 1.02 | 1.11 | 1.04 |
|  | Iso/Res (v/v) | 1 | 1 | 1 | 1 | 1 |
| Physical Property | Gel time (s) | 180 | 30 | 30 | 300 | 10 |
|  | Tack-free time (s) | 300 | 100 | 100 | 1200 | 20 |
|  | Burning time (m) | 2 | 4 | 4 | 10 | 10 |
|  | Flexibility | Poor | Poor | Moderate | Good | Good |

Increasing the ratio of polyamines imparts the flexibility of the coating; however, too much of polyamine in the formulation will affect the mechanical strength of the coating. Example 15 shows a good balance of flexibility and mechanical strength. Also, the tack-free time is shortened to 20 seconds by increasing the ratio of highly reactive chain extender Jefflinke 754, Boxxodur PC 136 to less reactive Desmophen NH1420. Fire retardant efficiency is greatly improved when expandable graphite is incorporated. An intumescence char layer is formed when a section of the coated pole is exposed to a direct torch burning.

Examples 16-19: Wood Stabilization Coatings

The long-standing desire for an exterior coating that will protect wood from environmental degradation can be achieved by the polyurea coating disclosed herein. Two component spray polyurea systems can be fast reacting and provide quick return-to-service coatings. The coating formulation as shown in Example 16 was applied to CCA— (chromated copper arsenate) treated SYP (Southern Yellow Pine) boards, which were either used for outdoor weathering test or QUV testing. QUV testing is an accelerated UV testing method. The coating maintains its color and gloss upon exposure to UV light weathered outside for one year or 2000 hours in a QUV chamber. However, the uncoated boards discolor and check under the same conditions.

QUV Testing: A Modified EN 927-6:
1. Test Chamber
The test chamber consists of an enclosure made from corrosion-resistant material which houses the lamps, a heated water tray, spray nozzles and test panel racks.
2. Lamps
A UV lamp emits UV light from a UV-A 340 lamp, with a peak emission at 340 nm.
3. Irradiance Control
The irradiance at 340 nm shall be set to 0.89 W/(m² nm). Apparatus equipped with an irradiance control system shall be calibrated in accordance with the manufacturer's recommendations.
4. Mounting the Test Panels
Secure the test panels in the sample holders (whenever possible) with two exposure windows of approximately 95 mm☐64 mm.
5. Exposure
An exposure cycle of one week consists of a condensation period followed by a 120 minutes of UV-A 340 irradiation and 30 minutes of water spray.
6. Sample Rotation and Maintenance
Once a week, examine the spray pattern using a glass cover in accordance with the manufacturer's recommendations and clean the spray nozzles if necessary.
6.1 Duration of Test
The cycle lasts for 168 hours (=1 week). The cycle shall be repeated in the total test exposure of 2000 hours. Testing the test panels shall be carried out without interruption except for servicing, maintenance of the apparatus and examination of the panels.

Example 16

| Chemicals | Supplier | Wt. % |
|---|---|---|
| Part A: Isocyanate | | |
| Desmophen XP2763 | Covestro | 53.99 |
| Desmophen N3900 | Covestro | 36 |
| UCAR EEP | DOW | 10.01 |
|  |  | 100 |
| Part B: Resin | | |
| Jeffamine D2000 | Huntsman | 33.44 |
| Bax PC136 | BASF | 13.38 |
| Jefflink754 | Huntsman | 20.06 |
| JLS-APP | JLS | 7.36 |
| JLS-Penta | JLS | 2.25 |
| JLS Melamine | JLS | 2.65 |
| Colorant | FSW OR | 0.8 |
| UCAR EEP | DOW | 20.06 |
|  |  | 100 |

More coating formulations were developed to meet different customer needs, for example, grey decking with more elastic coating. By carefully adjusting types and ratios for isocyanates, tack-free time or the work time can be tuned in a way a desired coating flexibility is achieved. (Examples 17, 18 and 19)

Example 17

| Chemicals | Supplier | Wt. % |
|---|---|---|
| Part A: Isocyanate | | |
| Desmophen XP2599 | Covestro | 45.8 |
| Desmophen N3400 | Covestro | 32.82 |
| Desmophen N3900 | Covestro | 21.37 |
|  |  | 100 |
| Part B: Resin | | |
| Jeffamine D2000 | Huntsman | 52.86 |
| Desmorphen NH1420 | Covestro | 6.17 |
| Jefflink754 | Huntsman | 30.84 |
| M-8-10 | Stepan | 6.61 |
| Colorant | Koppers | 3.52 |
|  |  | 100 |
| Gelling Time (m) | | 0.2 |
| Tack-free Time (m) | | 5 |

Example 18

| Chemicals | Supplier | Wt. % | |
|---|---|---|---|
| Part A: Isocyanate | | | |
| Desmophen XP2763 | Covestro | 43 | |
| Desmophen N3400 | Covestro | 57 | |
| | | 100 | |
| Part B: Resin | | | |
| Jeffamine D2000 | Huntsman | 52.86 | |
| Desmophen NH1420 | Covestro | 6.17 | |
| Jefflink754 | Huntsman | 30.84 | |
| Solvent M-8-10 | Stepan | 6.61 | |
| Grey colorant | Koppers | 3.52 | |
| | | 100 | |
| Gelling Time (m) | | 0.5 | |
| Tack-free Time (m) | | 10 | |

Example 19

| Chemicals | Supplier | Wt. % | |
|---|---|---|---|
| Part A: Isocyanate | | | |
| Desmophen XP2599 | Covestro | 43 | |
| Desmophen N3400 | Covestro | 57 | |
| | | 100 | |
| Part B: Resin | | | |
| Jeffamine D2000 | Huntsman | 52.86 | |
| Desmophen NH1420 | Covestro | 6.17 | |
| Jefflink754 | Huntsman | 30.84 | |
| Solvent M-8-10 | Stepan | 6.61 | |
| Grey colorant | Koppers | 3.52 | |
| | | 100 | |
| Gelling Time (m) | | 0.5 | |
| Tack-free Time (m) | | 20 | |

Coating formulation 19 was applied to CCA treated SYP boards, which were either used for outdoor weathering test or QUV testing. The coating maintains its color and gloss for 2000 hours in a QUV chamber. No checking or cracking were observed neither. However, the uncoated boards showed significant decoloring and checking under the same condition, indicating a degradation of wood and leaching of extractives.

In the case of natural weathering in the exterior, uncoated wood subsequently turned gray along with surface checking on both uncoated woods after 10 months outside due to the deposition of dirt and the effects of molds or wood-staining fungi. The coated five boards, on the other hand, kept their original color and surface integrity under the same weathering condition. This result therefore showed that this type of coating provides sufficient protection for SYP in the initial phase of the weathering test.

The invention claimed is:

1. A method of forming a fire retardant coating on one or more surfaces of a wood product comprising the steps of:
   a) providing a two-component system comprising (i) one or more aliphatic isocyanate compounds; and (ii) one or more aliphatic amine compounds and one or more amine chain extenders, wherein at least one of component (i) or component (ii) comprises one or more fire retardants;
   b) combining component (i) and component (ii) of step (a) in a spray gun to form a mixture of component (i) and component (ii);
   coating one or more surfaces of a wood product by spraying the mixture of step (b) onto one or more surfaces of said wood product.

2. The method of claim 1, wherein the ratio of aliphatic amine compound to isocyanate compound is from about 5:1 to about 1:5 (weight/weight).

3. The method of claim 1, wherein the ratio of aliphatic amine compound to isocyanate compound is from about 2:1 to about 1:2 (weight/weight).

4. The method of claim 1, wherein the ratio of aliphatic amine compound to isocyanate compound is from about 1.2:1 to about 1:1.2 (weight/weight).

5. The method of claim 1, wherein the ratio of aliphatic amine compound to isocyanate compound is approximately 1:1 (weight/weight).

6. The method of claim 1, wherein component (i) and component (ii) are pre-heated prior to (b) combining component (i) and component (ii).

7. The method of claim 1, wherein said aliphatic amine compound is selected from the group consisting of polyamines, primary amines, secondary amines and tertiary amines.

8. The method of claim 1, wherein component (ii) further comprises the one or more fire retardant.

9. The method of claim 1, wherein said aliphatic isocyanate compound is selected from the group consisting of isocyanate pre-polymers, aliphatic diisocyanates, trimerized aliphatic diisocyanates, and the biuretic form of aliphatic diisocyanates.

10. The method of claim 1, wherein said coating step (c) further comprises the step of allowing the coating of step (c) to cure for about 1 minute to about 120 minutes at ambient temperature.

11. The method of claim 1, wherein said coating step (c) further comprises the step of allowing the coating of step (c) to cure for less than about 1 minute at ambient temperature.

12. The method of claim 1, wherein said wood product is pre-treated with a wood preservative composition to render said wood product resistant to insect attack and/or fungal decay.

13. The method of claim 12, wherein said wood preservative composition comprises a metal compound and/or an organic biocide.

14. The method of claim 13, wherein said metal compound is selected from the group consisting of compounds of copper, zinc, iron, and silver.

15. The method of claim 13, wherein said metal compound is a copper compound.

16. The method of claim 15, wherein said copper compound is selected from the group consisting of copper metal, cuprous oxide, cupric oxide, copper hydroxide, copper carbonate, basic copper carbonate, copper oxychloride, copper 8-hydroxyquinolate, copper dimethyldithiocarbamate, copper omadine, copper borate and basic copper borates.

17. The method of claim 13, wherein said wood preservative composition is selected from the group consisting of Creosote (CR or CR-S), Ammoniacal copper zinc arsenate (ACZA), Chromated copper aresenate (CCA-C), Alkaline copper quat (ACQ, type A, B, C or D), Copper Azole (Type B, and C), Copper HDO Type A, Copper Naphthenate (CuN), Alkaline copper betaine (KDS, and KDS type B), Micronized copper azole (MCA and MCA-C), and Pentachlorophenol (PCP).

18. The method of claim 1, wherein said wood product is selected from the group consisting of a deck, a rail, a fence, a utility pole, a railway tie, a railroad bridge, cladding and siding.

19. The method of claim 1, wherein said wood product is timber, plywood, laminated veneer lumber (LVL), cross laminated timber (CTL), parallel strand lumber (PSL), structural glued laminated timber, particle board or lumber.

20. The method of claim 1, wherein said coating is applied to said wood product while the wood product is in service in the field.

21. The method of claim 1, wherein said coating is applied to said wood product prior to said wood product being placed into service.

22. The method of claim 1, wherein the one or more fire retardants comprise a phosphate compound.

23. A method of imparting increased dimensional stability to a wood product comprising the steps of:
   a) providing a two-component system comprising (i) one or more aliphatic isocyanate compounds; and (ii) one or more aliphatic amine compounds and one or more amine chain extenders;
   b) combining component (i) and component (ii) of step (a) in a spray gun to form a mixture of component (i) and component (ii);
   c) coating one or more surfaces of said wood product by spraying the mixture of step (b) onto one or more surfaces of said wood product;
   wherein said wood product has increased dimensional stability compared to a wood product that has not been treated according to steps (a), (b), and (c).

24. The method of claim 23, wherein the ratio of aliphatic amine compound to isocyanate compound is from about 5:1 to about 1:5 (weight/weight).

25. The method of claim 23, wherein the ratio of aliphatic amine compound to isocyanate compound is from about 2:1 to about 1:2 (weight/weight).

26. The method of claim 23, wherein the ratio of aliphatic amine compound to isocyanate compound is from about 1.2:1 to about 1:1.2 (weight/weight).

27. The method of claim 23, wherein the ratio of aliphatic amine compound to isocyanate compound is approximately 1:1 (weight/weight).

28. The method of claim 23, wherein component (i) and component (ii) are pre-heated prior to said mixing step (b).

29. The method of claim 23, wherein said aliphatic amine compound is selected from the group consisting of polyamines, primary amines, secondary amines and tertiary amines.

* * * * *